Patented Dec. 9, 1941

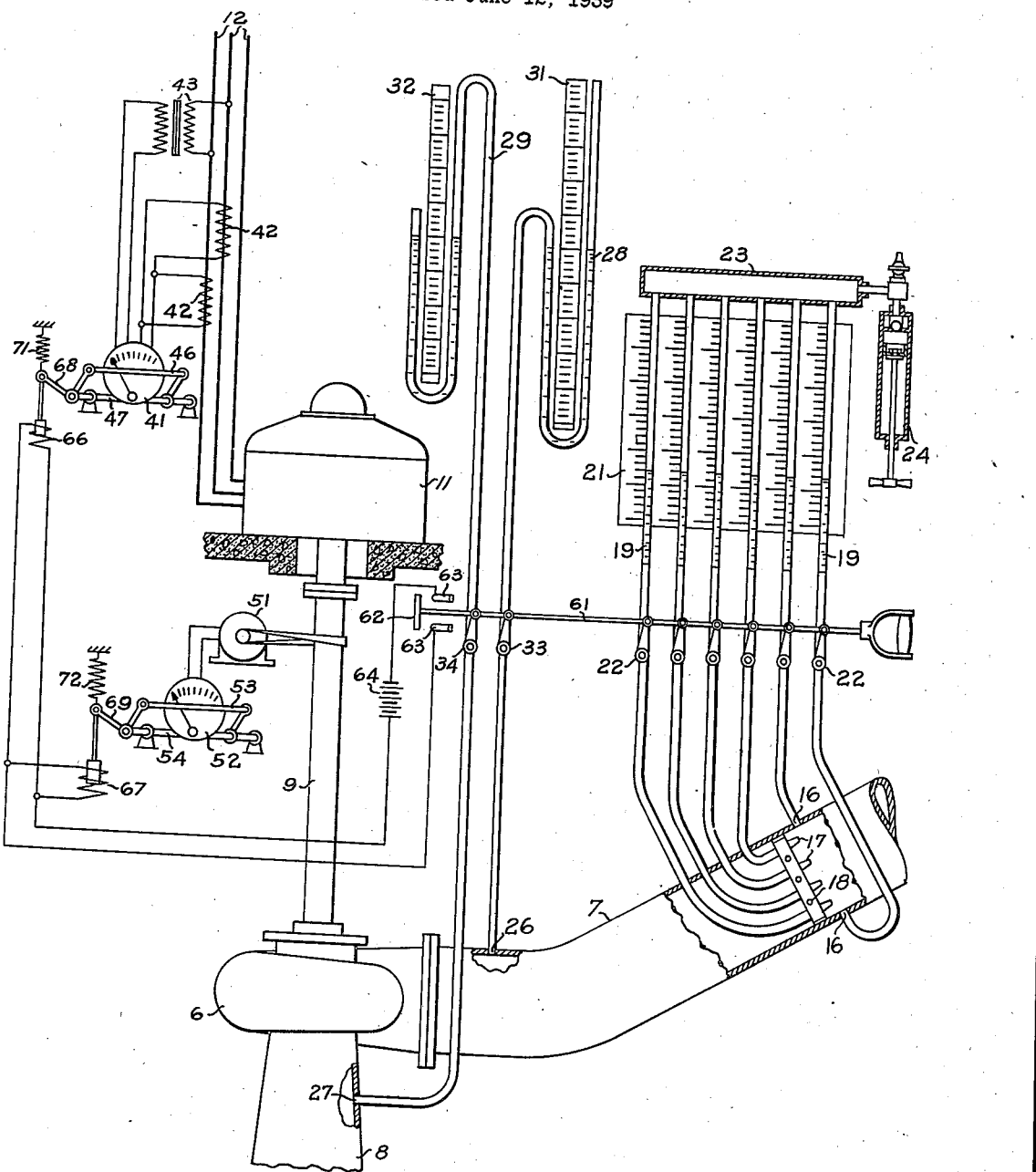

2,265,787

UNITED STATES PATENT OFFICE 2,265,787

HYDRAULIC TESTING SYSTEM

William M. White, Milwaukee, Wis.

Application June 12, 1939, Serial No. 278,638

5 Claims. (Cl. 73—51)

This invention relates to improvements in measuring and testing systems in which at least a portion of the measurements are related to the flow conditions of a fluid and more particularly to a system for testing installations involving hydraulic machines such as hydroelectric generating units or pumps driven by either mechanical or electrical driving means.

Under present conditions, hydraulic machines such for example as hydraulic turbines, are sold under fixed guarantees of efficiencies at predetermined operating conditions and acceptance tests must be carried out to determine whether or not such guaranteed efficiencies have been attained. An authoritative current test requires either that the tests be made after complete installation of the turbo generating unit or, if such field tests are impossible, that tests be made in a laboratory on a model turbine with its complete setting and with the turbine and setting truly homologous with the actual unit. Every effort is therefore made to make the tests on the actual turbo generating unit itself from which the actual input and output of the turbine and generator may be determined. The output of a turbine may be readily determined by meaurement of the generator output by a single instrument, adding to such measurement the known generator losses. The input to a turbine must, however, be determined by measurement of the quantity of water flowing (in cubic feet per second) times the effective head on the turbine (pressure head minus velocity head) times a constant (62.4 divided by 550). The input quantities above mentioned cannot be measured by a single instrument and could not therefore heretofore be read sufficiently simultaneously to prevent the occurrence of large variations when the turbine tests were made at different times or by different persons even though the operating conditions were identical for the several tests.

It is therefore an object of the present invention to provide a testing system for hydraulic machines in which identical measurements are obtainable for identical test conditions whether or not the tests are made at different times or by different persons.

Another object of the invention is to provide a testing system in which the indications of a plurality of measuring instruments may be obtained simultaneously with any required degree of accuracy.

Another object of the invention is to provide a testing system in which a single means is employed to fix the indications of a plurality of measuring instruments thereby permitting such measurements to be recorded as desired.

Another object of the invention is to provide a testing system in which all of the measurements for testing a hydraulic unit, whether a turbine driving a generator or a pump driven by a motor, may be fixed simultaneously for reading of the instantaneous values of all instruments by a single observer.

Objects and advantages other than those above set forth will be apparent from the following description when read in connection with the accompanying drawing which diagrammatically illustrates the application of the present testing system to the testing of a hydroelectric generating unit.

Referring more particularly to the drawing by characters of reference, the reference numeral 6 indicates the spiral casing of a hydraulic turbine to which water is supplied by a penstock 7 and from which water is discharged into a draft tube 8. The turbine shaft 9 drives an electric generator 11 which supplies electric energy to a distribution line 12. To determine both the quantity and the effective head of the water supplied to the turbine, it is necessary to determine both the pressure head and the velocity head of the water flowing through the penstock 7. A number of piezometer tubes 16 are mounted in the walls of the penstock immediately adjacent a plurality of Pitot tubes mounted within the penstock on a suitable support or rack 18. Both piezometer and Pitot tubes are connected to manometer tubes 19 which are mounted in side by side relation on a board 21 carrying a suitable scale. The several manometer tubes are each provided with stop cocks 22 and are connected at the upper ends by a manifold 23 which is connected to an air pump 24. It is therefore possible to place the level of the liquid within the manometers 19 at any desired point on the scale by balancing the hydraulic heads acting on the piezometer and Pitot tubes by air pressure from the pump. The Pitot tubes 17 will provide a reading of both the pressure head and the velocity head whereas the piezometer tubes 16 will provide indications of only the pressure head. It is therefore possible to determine the velocity head alone by obtaining the difference between the readings of the two types of tubes. It will be understood that the above combination of piezometer and Pitot tubes may be used for measuring the pressure and velocity heads in a conduit whether or not such means are used in connection with the testing of a hydraulic turbine.

The actual pressure head acting on the turbine is composed of the sum of the positive pressure head of the water actually supplied to the turbine, and is preferably taken in the speed ring or discharge orifice from the spiral casing into the turbine runner chamber, and the negative pressure head produced by the draft tube 8. A piezometer tube 26 is therefore mounted ahead of the turbine and is herein indicated for the sake of clarity as being mounted in the penstock 7 and a second piezometer tube 27 is mounted in the wall of the draft tube 8, preferably at a point beyond the zone of turbulence and unequal pressure across the draft tube which zone is always present for some distance beyond the discharge edges of the runner vanes. Piezometer tubes 26 and 27 are connected with manometers 28 and 29 respectively equipped with suitable scales 31 and 32. The manometer tubes 28 and 29 are provided with stop cocks 33 and 34 respectively. The sum of the readings on the two manometers 28 and 29 is taken as the total pressure head acting on the turbine, the partial vacuum in the draft tube 8 being just as effective in producing power as the positive pressure of the water supplied to the turbine runner.

The power output of the turbine is taken as the generator output plus the generator losses. Such output is measured by a wattmeter indicated at 41 and having the current coil thereof connected with the transmission line 12 by current transformers 42, while the voltage coil is connected with the transmission line 12 through the voltage transformer 43. The wattmeter 41 is shown as being provided with means such as a bar 46 pivoted at 47 and movable into position to clamp the pointer in its then position upon movement of the bar.

It is desirable that the several readings of the various measuring instruments be taken at known speeds or even at the same speed of rotation of the turbine. A known type of speed measuring and indicating means is therefore shown as a tachometer 51 belted to the turbine shaft or otherwise driven from the turbine and which actuates an indicator 52. The indicator 52 is also provided with a bar 53 pivoted at 54 and movable into position to clamp the indicator pointer in its then position.

The present testing system provides means for simultaneously fixing the indications of the several measuring instruments employed in such system. Such means comprises a rod 61 connected with the stop cocks 22, 33 and 34 in such manner that a single movement of the rod will operate all of the cocks. One end of the rod 61 is provided with a contact 62 designed to bridge a pair of contacts 63, in one position of the rod, to complete a circuit from a battery 64 to a plurality of solenoids 66 and 67 acting on bell cranks 68 and 69 respectively for moving the clamping bars 47 and 53 into clamping position against the tension of springs 71 and 72. A single movement of the rod 61 thus closes all of the stop cocks and clamps the several pointers to fix the indications of all of the measuring instruments in their then position and an opposite movement releases all of the indications of the measuring instruments. It is thus possible for one observer to read any or all of the instruments of the improved testing system with any desired degree of accuracy thus eliminating possible errors due to hurried reading, to reading of moving indicators or to the reading of the same instruments by different observers. It will be understood that the above system in its entirety may be used either for testing a hydraulic turbine driving an electric generating unit or that the system may be used for testing a pump driven by suitable driving means.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a system for testing a hydroelectric generating unit, a plurality of manometers for measuring the effective head of water applied to the generating unit, a plurality of manometers for measuring the velocity of flow of the water supplied to the generating unit, a wattmeter for measuring the output of the generator, valves controlling the connections of all said manometers, a bar movable to clamp the pointer of said wattmeter in its then position, a solenoid for actuating said bar, a source of electric current for said solenoid, and a single lever for operating said valves and for controlling energization of said solenoid for simultaneously fixing the indications of all said manometers and of said wattmeter.

2. In a system for testing a hydroelectric generating unit, a plurality of manometers for measuring the velocity of flow of the water supplied to the generating unit, valves controlling the connections of all said manometers, a wattmeter for measuring the output of the generator, a tachometer for measuring the speed of rotation of the generating unit, bars severally movable to clamp the pointers of said wattmeter and of said tachometer in their then positions, solenoids for severally actuating said bars, a source of electric current for said solenoids, and a single lever for operating said valves and for controlling the energization of said solenoids to simultaneously fix the indications of all said manometers and of said wattmeter and of said tachometer.

3. In a system for testing a hydraulic unit, means for measuring the effective head of water applied to the unit, means for measuring the velocity of flow of the water supplied to the unit, valves severally controlling the connection of said head and said velocity measuring means, a gauge having a pointer for indicating the power produced by the unit, a bar for clamping the pointer of said gauge in position, and a lever for actuating said valves and for controlling movement of said bar into position for clamping the pointer of said gauge.

4. In a system for testing a hydraulic unit, means for measuring the effective head of water applied to the unit, means for measuring the velocity of flow of the water supplied to the unit, valves severally controlling the connection of said head and said velocity measuring means, a gauge having a pointer for indicating the power produced by the unit, a bar for clamping the pointer of said gauge in position, electrically operated means for moving said bar into clamping position, and a lever for actuating said valves and for controlling energization of said bar actuating means.

5. In a system for testing a hydraulic unit, means for measuring the effective head of water applied to the unit, means for measuring the velocity of flow of the water supplied to the unit, valves severally controlling the connection of said head and said velocity measuring means, a gauge having a pointer for indicating the power produced by the unit, a bar for clamping the pointer of said gauge in position, a solenoid for moving said bar into clamping position, a source of electric current for energizing said solenoid, and a lever for actuating all of said valves and for controlling connection of said solenoid with said source of electric current.

WILLIAM M. WHITE.